March 27, 1934.  W. P. NORRIS  1,953,006

CULVERT PIPE

Filed June 16, 1931

Inventor
W. P. NORRIS

His Attorney

Patented Mar. 27, 1934

1,953,006

UNITED STATES PATENT OFFICE 1,953,006

CULVERT PIPE

William P. Norris, Clarinda, Iowa

Application June 16, 1931, Serial No. 544,838

3 Claims. (Cl. 72—52)

My invention relates to pipes, especially adapted for use in culverts under highways, railroads, and the like.

An important object of my invention is to provide a reinforced concrete or composition pipe.

A further object is to provide a concrete or composition pipe with additional strength without enlarging the pipe shell except at points where the greatest failure exists thus securing additional strength with but small additional cost.

A still further object is to provide a pipe having flexible means for allowing the pipe to settle to an irregular grade line without producing a high internal stress, or cracking of the pipe.

Figure 1:
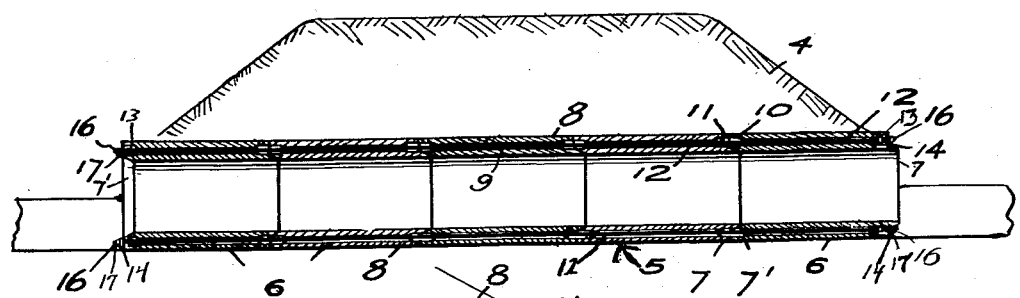
Figure 2:
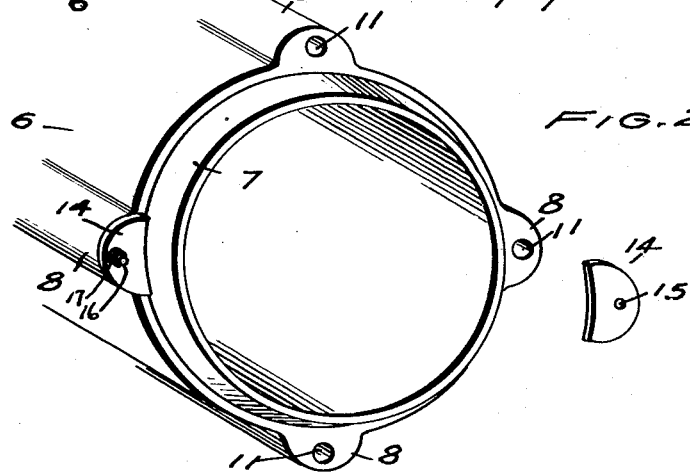
Figure 3:
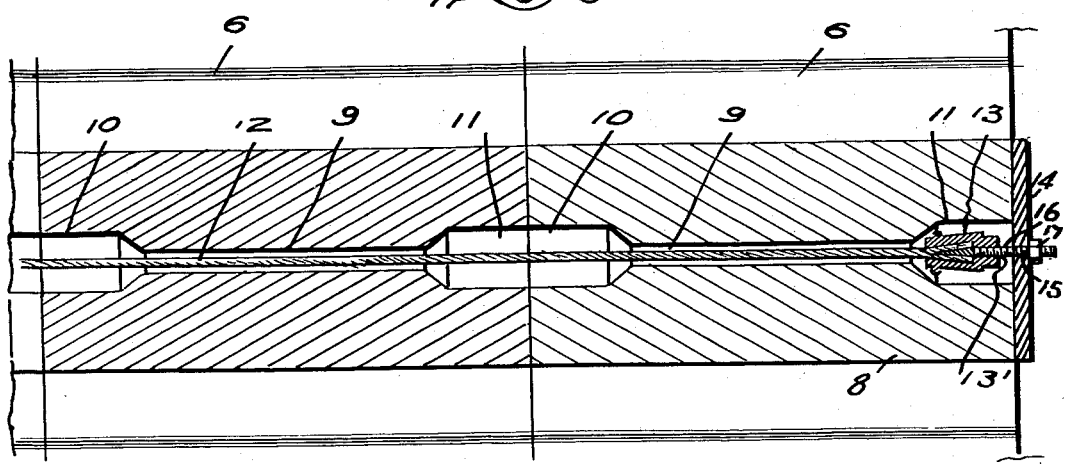

In the accompanying drawing forming a part of this application, and in which like numerals are employed to designate like parts in all views, Figure 1 is a plan sectional view of a culvert embodying my invention;

Figure 2 is an end view of a section of pipe showing the rib ends and the bearing plates adapted to be fastened to the ends, and Figure 3 is a sectional view taken thru the ribs of several sections of pipe and showing the tie means disposed therein.

In the drawing, wherein for the purpose of illustration, is shown a preferred embodiment of my invention, the numeral 4 designates a road-bed under which a culvert 5 is disposed. The culvert 5 comprises sections of coupled pipe 6 of concrete or tile, or any other composition matter, the ends of which are provided with suitable coupling means.

In Figure 2, it will be noted, that the coupling means at one end of each section of pipe is a circular projecting lip 7, while at the opposite end there is provided a lip receiving recess 7', as shown in Figure 1. It will be seen that sections of pipe can thus be coupled by seating the lip of one pipe within the lip receiving recess of another pipe to form a continuous line of pipe.

The pipe 6 further comprises a plurality of ribs or lugs 8 throughout the length of the pipe, and provides strengthening means for the pipe. The ribs 8 are provided with tie cable channels 9 extending throughout the length of each section of pipe and have enlarged end recesses 10 and 11.

Adapted to be disposed through each channel 9 is a cable 12 which helps to hold the sections of pipe in place, and provides pipe flexibility. Secured to one free end of the cable 12 is a wedge lock 13 having a central opening 13', and housed by the enlarged recess 11. Numeral 14 designates a metal bearing plate conforming to the shape of the rib and designed to transmit the stress from the cable to the rib, and is provided with an opening 15 through which a screw stem 16 is adapted to pass screwing into the wedge lock 13, and wedging the end of the cable 9 against the wedge lock 13.

The threaded stem 16 also projects outward of the bearing plate and a nut 17 is screwed on the stem 16 and holds the bearing plate against the rib and is used to transmit the stress from the cable to the bearing plate 14. The other free end of the cable is provided with like means and it will be seen that secure tie cable tension means are furnished.

In the installation of my pipes the following method is used: The cables will be cut at approximately the length of the culvert desired, and a wedge lock fastened to the end of each cable used. The cables are then threaded through the ribs and through each section of pipe. When the last section of culvert pipe has been threaded, another wedge lock is fastened to each of the cables. After this attachment the necessary tension is taken up by the nut on the outside of the metal bearing plate.

It will be seen that I have provided a superior culvert pipe by strengthening the pipe with ribs thus strengthening the longitudinal stress of the pipe. Due to the load that is placed on pipes an ordinary pipe will either fail at the sides or at the top and bottom by cracking, being the point of greatest stress. By my arrangement, however, I have overcome this objection. Further, due to the fact that one does not have a plane to lay any pipe in excavation, but minor irregularities in the subgrade, any connections made between pipes must be of a flexible nature. By use of rods or other rigid fixtures, this produces a high internal stress in the pipe and causes the same to fail. Also where pipes are laid under a heavy fill in a great many cases they are laid with a camber, or in other words, the pipes used under the center of a roadway are placed at a considerable higher elevation than placed at each end, so that after the fill has been placed upon the pipes they will settle to a uniform grade line. This would not be possible with any rigid connection between the pipes so by my cable arrangement I have provided means for this accomplishment.

It is to be understood that the form of my invention herewith shown and described is to be taken as a preferred embodiment of the same, and that various changes in shape, size and arrangement of parts may be resorted to without departing from the spirit of my invention and scope of the subjoined claims.

Having thus described my invention what I claim is:

1. In a culvert composed of sections of pipe, each pipe provided with a plurality of outwardly arranged spaced ribs, a laterally extending lip arranged at one end of each pipe and a lip receiving recess disposed at the opposite end, channels located in said ribs and provided with enlarged openings at each end, flexible cables disposed within said openings, locking elements located within the enlarged rib openings of the first and last sections of pipe and secured to the ends of the flexible cables, bearing plates arranged at the ends thereof, a screw stem carried by each of said plates for wedging the ends of cables against the locking elements for securely holding the cable, said screw extending outwardly of each of said bearing plates and provided with means for taking up the tension.

2. In a culvert composed of sections of pipe, each pipe provided with ribs, channels located in said ribs and provided with enlarged openings at each end, flexible cable tie elements disposed within said channels, locking elements located within the enlarged end openings of the first and last sections of pipe and connected to the ends of the flexable cables, each locking element having a central opening therein, plates arranged at the ends of the ribs of the first and last sections of pipe, and means carried by said plates for extending through the central opening in each cable locking element for wedging the end of the cable against the locking element for securely holding the cable.

3. The structure of claim 2, characterized by said means comprising a screw stem, said stem extending outwardly of each rib and provided with means for tensioning the cable.

WILLIAM P. NORRIS.